United States Patent [19]

Yoshida

[11] 4,434,443

[45] Feb. 28, 1984

[54] TAPE RECORDER

[75] Inventor: Kobun Yoshida, Saitama, Japan

[73] Assignee: Pioneer Electronic Corporation, Tokyo, Japan

[21] Appl. No.: 286,488

[22] Filed: Jul. 24, 1981

[30] Foreign Application Priority Data

Jul. 25, 1980 [JP] Japan .................................. 55-101318

[51] Int. Cl.³ ............................................. G11B 15/48
[52] U.S. Cl. ..................................... 360/74.4; 360/74.1
[58] Field of Search ....................... 360/74.4., 74.1, 75, 360/105, 137, 55, 73, 72.1, 71; 242/191; 179/100.1 PS, 100.1 VC

[56] References Cited

U.S. PATENT DOCUMENTS 4,170,789 10/1979 Inoue ................................... 360/74.1
4,228,472 10/1980 Magata ............................... 360/74.4
4,323,935 4/1982 Koizumi ............................. 360/74.4
4,328,520 5/1982 Iwata ................................... 360/74.4

Primary Examiner—Robert Martin Kilgore
Attorney, Agent, or Firm—Sughrue, Mion, Zinn, Macpeak and Seas

[57] ABSTRACT

A tape recorder in which an inter-music detecting function and either a fast-forward or rewind operation can be simultaneously activated with one finger. Cuts are formed in adjacent sides of a fast-forward operation button and a rewind operation button with the inter-music detector operation button arranged within the cuts. The inter-music detector function is latched upon simultaneous actuation of the inter-music detector actuating button and one of the fast-forward operation button and rewind operation button. The locking may be performed either mechanically or electronically.

7 Claims, 7 Drawing Figures

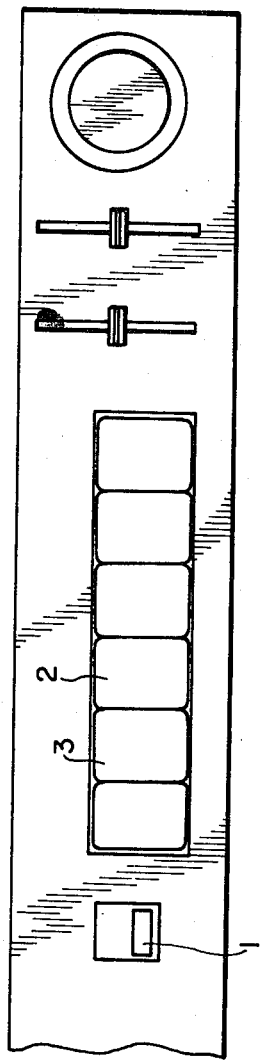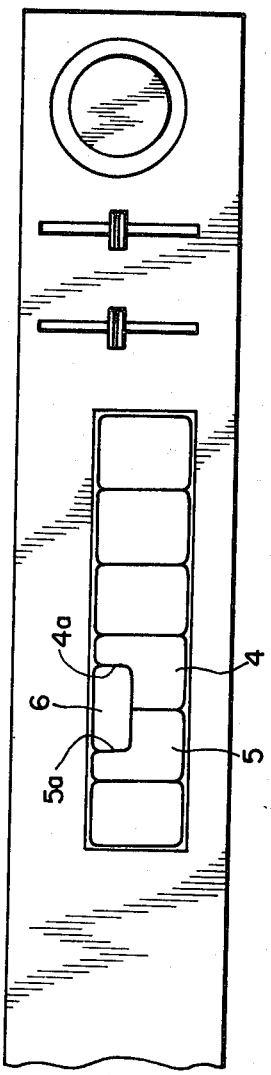
FIG. 1 (PRIOR ART)
FIG. 2

TAPE RECORDER

BACKGROUND OF THE INVENTION

The present invention relates to tape recorders, and more particularly to a tape recorder having an inter-music (or inter-song) detecting function (hereinafter referred to as "a PMS function" when applicable) which can detect a part of a magnetic tape where nothing is recorded or between adjacent parts where music is recorded.

A tape recorder of this type has a PMS operation button in addition to an FF (fast-forward) operation button and a REW (rewinding) operation button. In Such a tape recorder, when the PMS operation is effected by operating the PMS operation button, the FF or REW operation button is operated to perform an FF or REW operation. If under the condition that the FF or REW operation is effected by operating the FF or REW operation button and the PMS operation button is operated to perform a PMS operation, the inter-music part of the tape will be detected during the FF or REW operation so that in response to the detection of the inter-music part the tape will stop at or the reproduction of the tape will start from the inter-music part.

Although the PMS operation button is operated together with the FF or REW operation button as described above, the PMS operation button 1 has been provided remote from the FF operation button 2 or the REW operation button 3 in the conventional tape recorder as shown in FIG. 1. Accordingly, it is necessary to separately operate the PMS operation button 1 and the FF operation button 2 or the REW operation button 3, which lowers the operability of the tape recorder.

Furthermore, it is necessary to manually operate the PMS operation button 1 to de-activate the PMS function. Accordingly, whenever only the FF or REW operation is required under the condition that the PMS function is activated, it is necessary to turn off the PMS operation button 1. This operation is troublesome and time-consuming. In addition to the above-described drawbacks, the conventional tape recorder suffers from a further difficulty in that, if the operator operates the FF or REW operation button without noticing the fact that the PMS function has been activated, then although only the FF or REW operation is required, the FF or REW operation will be halted during such an operation at inter-music intervals. That is, an erroneous operation occurs.

The invention is intended to eliminate the above-described drawbacks accompanying a conventional tape recorder. More specifically, an object of the invention to to provide a tape recorder in which the operability is improved, the operation thereof can be achieved readily and no erroneous operation occurs.

SUMMARY OF THE INVENTION

Accordingly, the invention provides a tape recorder including a fast-forward operation button, a rewind operation button, and an inter-music detector actuating button with the inter-music detector actuating button being arranged relative to the fast-forward operation button and the rewind operation button so that the inter-music detector actuating button and a selected one of the fast-forward operation button and the rewind operation button can simultaneously be actuated with one finger. Means is provided for locking the inter-music detector function upon actuation of the inter-music detector actuating button and one of the fast-forward and rewind operation buttons. This can be done either mechanically or electronically. In a preferred embodiment, cuts are provided in the fast-forward operation button and the rewind operation button in which the inter-music detector actuating button is arranged.

BRIEF DESCRIPTION OF THE DRAWINGS

FIG. 1 is a front view of a conventional tape recorder;

FIG. 2 is a front view of a tape recorder according to a preferred embodiment of the invention;

DESCRIPTION OF THE PREFERRED EMBODIMENTS

Figure 3:
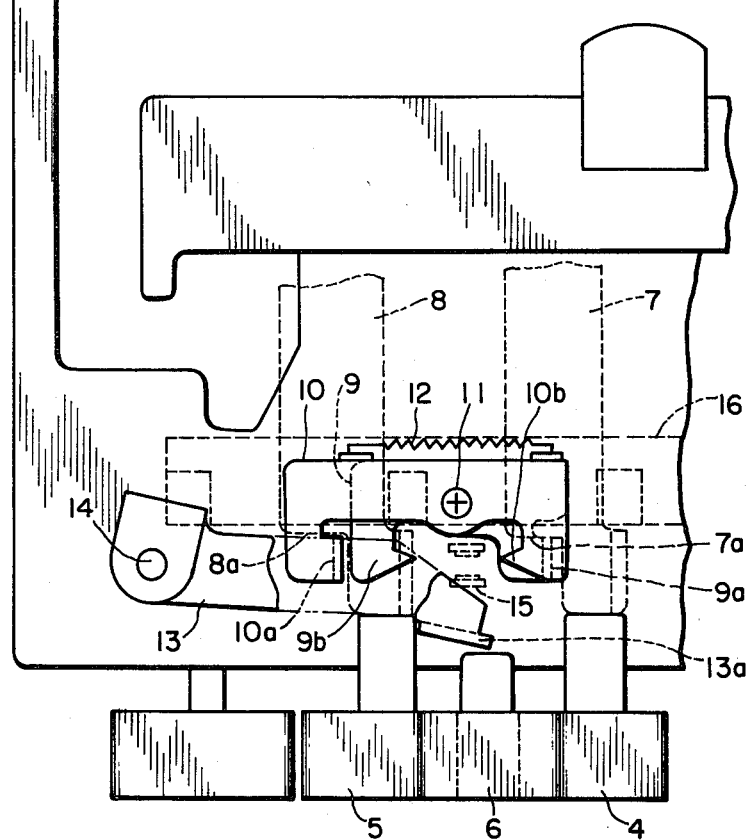
FIG. 3 is a plan view of the operating mechanism of the tape recorder of the invention.
Figure 4:
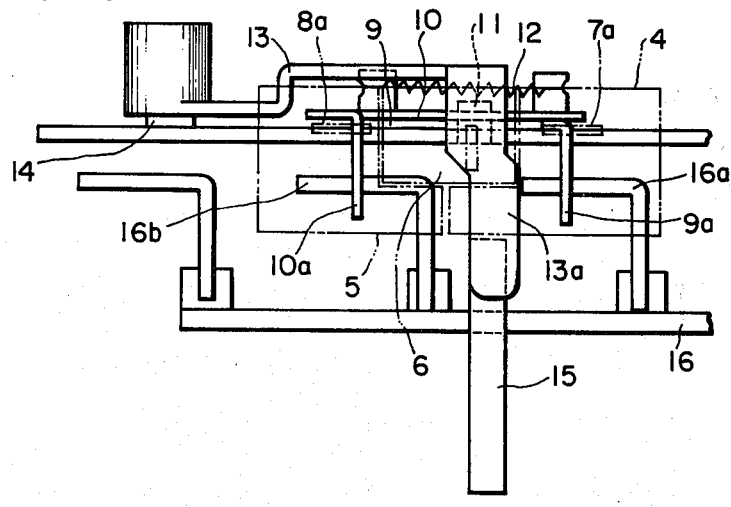
FIG. 4 is a front view of the operating mechanism.

A first preferred embodiment of the invention will be described with reference to FIGS. 2 through 6. In FIG. 2, reference numeral 4 designates an FF button and 5 an REW button. The bottons 4 and 5 are arranged adjacent to each other. Cuts 4a and 5a are formed in the corners of the adjacent sides of the buttons 4 and 5. The combination of the cuts 4a and 5a forms a single rectangular space in which a PMS operation (inter-music detector activating) button 6 is inserted.

In FIG. 3, reference numeral 7 designates an FF lever, 8 an, REW lever, 9 an FF operation plate, and 10 an REW operation plate. The end faces of the levers 7 and 8 are abutted against the FF button 4 and the REW button 5, respectively. The operation plates 9 and 10 are rotatably mounted on a common shaft 11, and a tension spring 12 is connected between the operation plates 9 and 10. The FF operation plate 9 has a bent portion 9a which is elastically abutted against a shoulder 7a of the FF lever 7 by the tension spring 12. Similarly, the REW operation plate 10 has a bent portion 10a which is elastically abutted against a shoulder 8a of the REW lever 10 by the tension spring 12.

Further in FIG. 3, reference numeral 13 designates a PMS lever and 15 a PMS switch. The PMS lever, which is pivotally mounted on a shaft 14, has an engaging plate 13a at the end thereof. The PMS lever is so urged that the engaging plate 13a is elastically abutted against the aforementioned PMS operation button 6. The PMS switch 15 is turned on by the engaging plate 13a when the button 6 is depressed.

Figure 5:
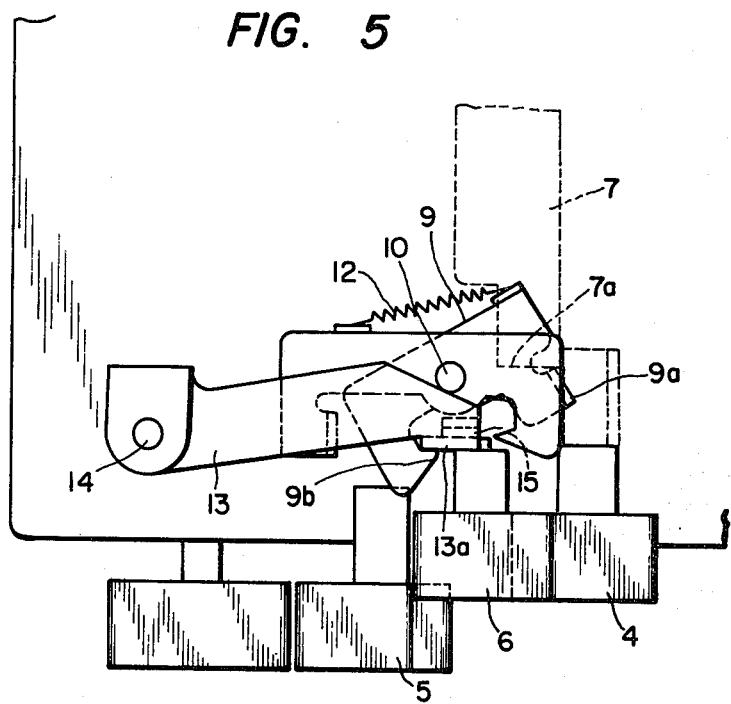
FIG. 5 is an explanatory diagram for a description of the FF and PMS operations of the operating mechanism.

The operation of the above-described mechanism will be described. In order to carry out a FF operation and a PMS operation simultaneously, the FF button 4 and the PMS operation button 6 are depressed with the same finger. Then, the FF lever 7 is moved as shown in FIG. 5 so that the head base and the circuit are operated in the FF mode. As the FF lever 7 is moved, the shoulder 7a is disengaged from the bent portion 9a of the FF operation plate, as a result of which the FF operation plate 9 is turned counterclockwise about the shaft 11 by the tension spring 12.

On the other hand, when the PMS operation button 6 is pushed, the engaging plate 13a of the PMS lever 13 is pushed to turn on the switch 15. At the same time, the engaging pawl 9b of the FF operation plate 9 engages with the rear surface of the engaging plate 13a to thereby hold the PMS lever 13 at its operational position.

This state is released by operating a locking plate 16 shown in FIG. 3. That is, upon operation of the locking plate 16, a releasing portion 16a (FIG. 4) thereof pushes back the bent member 9a of the FF operation plate 9 so that the FF operation plate 9 is turned clockwise against the elastic force or the tension spring 12 disengaging the engaging pawl 9b from the engaging plate 13a.

Figure 6:
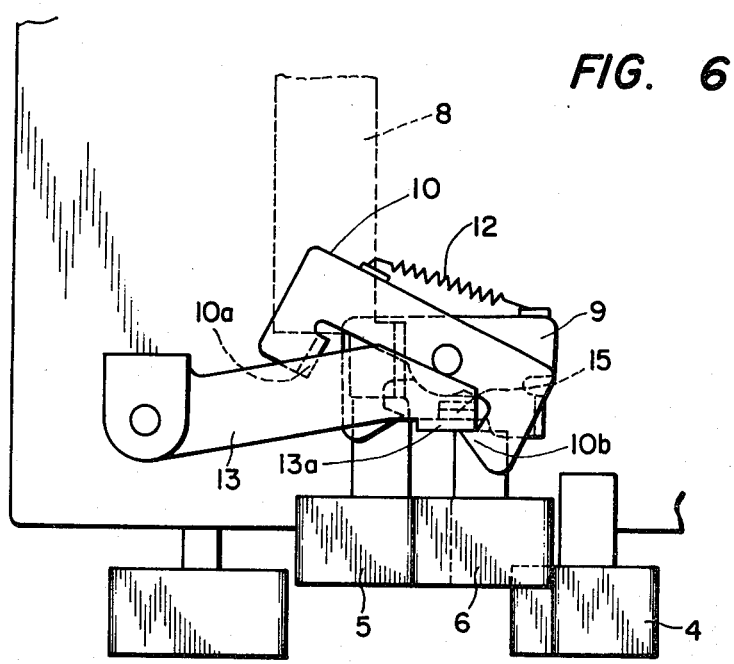
FIG. 6 is an explanatory diagram for a description of the REW operation and the inter-music detecting operation of the operating mechanism.

If the REW operation and the PMS operation are carried out simultaneously, the REW button 5 and the PMS operation button 6 (FIG. 2) are pushed simultaneously. Then, the REW lever 8 is pushed as shown in FIG. 6 so that the REW operation plate 10 is turned clockwise. Upon operation of the REW operation plate 10, an engaging pawl 10b thereof engages with the engaging plate 13a which turns on the switch 15 and hence holds the PMS lever 13 at the operation position.

Upon operation of the locking plate 16, the releasing portion 16b pushes back the bent portion 10a of the REW operation plate 10 turning the plate 10 counterclockwise, as a result of which the engaging pawl 10b is disengaged from the engaging plage 13a. Thus, the mechanism is returned to the former state.

According to the invention, the FF button or the REW button and the inter-music detecting button can be operated with one finger. Thus, no erroneous operation arises, and the operation can be carried out with ease. Furthermore, simultaneously with the release of the FF button of the REW button, the inter-music detecting button can be released. Therefore, the operation is simple and can be achieved quickly and accurately.

Figure 7:
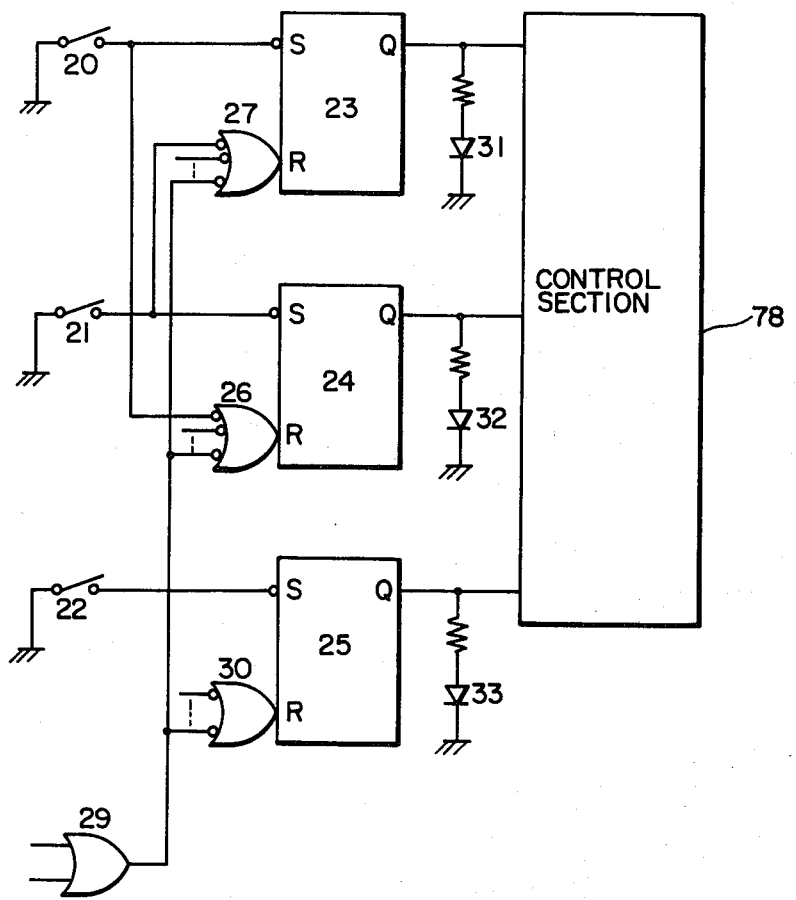
FIG. 7 is a schematic diagram of an electronic circuit employed in the tape recorder of the invention.

A second preferred embodiment, in which the above-described operations are implemented electronically, will be described with reference to FIG. 7.

An FF switch 20, an REW switch 21 and a PMS switch 22 are provided for the FF operation button 4, the REW operation button 5 and the PMS operation button 6, respectively. These switches 20, 21 and 22 are normally-open momentary switches which are closed by depressing the operation buttons 4, 5 and 6, respectively. The FF switch 20 is connected between ground and the set input terminal of an FF holding R-S flip-flop 23. The REW switch 21 is connected between ground the set input terminal of an REW holding R-S flip-flop 24. Similarly, the RMS switch 21 is connected between ground and the set input terminal of a PMS holding R-S flip-flop 25. Furthermore, the FF switch 20 and the REW switch 21 are connected through OR tages 26 and 27 to the reset input terminals of the flip-flops 24 and 25, respectively.

Each of the flip-flop 23 through 25 in the reset state is placed in the set state when its set input is raised to an "H" level (high logic level) from an "L" level (low logic level), as a result of which the Q output thereof is raised to the "H" level from the "L" level. In contrast, each of the flip-flops 23 through 25 in the set state is placed in the reset state when its reset input is raised to the "H" level from the "L" level, as a result of which the Q output thereof is set to the "L" level from the "H" level.

The Q outputs of the flip-flops 23 through 25 are connected to a mechanism control section 28 adapted to control the mechanism of the tape recorder. The control section 28 operates to place the mechanism of the tape recorder in the FF state and in the REW state when the Q outputs of the flip-flops 23 and 24 are raised to the "H" level from the "L" level, respectively. When the Q outputs of the flip-flops 23 and 24 are set to the "L" level from the "H", the control section 28 releases the FF operation and the REW operation of the mechanism, respectively. When the Q output of the flip-flop 25 is raised to the "H" level from the "L" level, the control section 28 operates to activate an inter-music detection circuit. When the Q output of the flip-flop 25 is set to the "L" level from the "H" level, the control section 28 releases the operation of the inter-music detection circuit.

An inter-music detection signal and a tape end detection signal are applied to an OR gate 29, the output of which is applied through an OR gate 30 to the reset input terminal of the flip-flop 25. Therefore, in response to the provision of the inter-music detection signal or the tape end detection signal, the flip-flop 25 in the set state is placed in the reset state. The output of the OR gate 29 is applied through the OR gates 27 and 26 respectively to the reset input terminals of the flip-flops 23 and 24 so that the set state of each of the flip-flops 23 and 24 is changed to the reset state in response to the provision of the inter-music detection signal or the tape end detection signal.

The Q outputs of the flip-flops 23, 24 and 25 are grounded through resistors and FF, REW and PMS operation displaying indicators 31, 32 and 33, which are light emitting elements such as photo-diodes, so that the FF, REW and PMS operations are displayed when the indicators 31, 32 and 33 are turned on, respectively.

In response to the operations of a play operation button and a stop operation button, for instance, (other than the FF, REW and PMS operation buttons) signals are applied to the OR gates 26, 27 and 30. Thus, when the play operation button, for instance, is operated, the FF, REW and PMS operations are released.

If, under the condition that the mechanism of the tape recorder is stopped and the flip-flops 23, 24 and 25 are in the reset state, the FF operation button 4 and the PMS operation button 6 are depressed at the same time, the FF switch 20 and the PMS switch 22 are turned on to set the flip-flops 23 and 25 respectively. As a result, both of the Q outputs of the flip-flops 23 and 25 are raised to the "H" level whereupon the control section 28 operates to cause the mechanism to conduct the FF operation and activates the inter-music detection circuit.

When the inter-music detection circuit thus activated detects a part of the tape where nothing is recorded, the circuit outputs the inter-music detection signal at an "H" level. This signal is applied through the OR gate 29 and through the OR gates 27 and 30 to the reset input terminals of the flip-flops 23 and 25 to reset the latter. As a result, the Q outputs of the flip-flops 23 and 25 are set to the "L" level, whereupon the control section 28 releases the FF operation of the mechanism and the operation of the inter-music detection circuit.

Next, it is assumed that, in addition to the above-described operation, the play operation button (not shown) has been operated. In this case, after the FF operation is released, the play operation is carried out in succession. That is, the play operation is started from the detected inter-music, i.e. the beginning of a song or the like. However, in the case where the play operation button is not operated, upon release of the FF operation the mechanism is stopped, that is, running of the tape is stopped at the inter-music part.

The FF operation of the mechanism and the operation of the inter-music detection circuit as described above is released in response to a tape end signal. This is an "H" level signal outputted by the tape end detection circuit when no inter-music part is detected until the tapes runs to the end.

When the REW operation button 11 and the PMS operation button 12 are operated simultaneously, the flip-flops 24 and 25 are set so that the control section 28 causes the mechanism to conduct the FF operation and activates the inter-music detection circuit. Furthermore, in response to the inter-music part detection or the tape end detection, the flip-flops 24 and 25 are reset so that the REW operation and the operation of the inter-music detection circuit are released.

When only the FF operation button or the REW operation button is operated, only the FF operation or the REW operation is ordinarily carried out. Irrespective of the presence of the inter-music part, the tape is run to the end unless a stop operation is carried out. The tape is stopped in response to the tape end signal which is outputted when the tape has been run to the end.

The FF or REW operation and the PMS operation set by operation button are released in response to the detection of the inter-music prat of the tape. Therefore, the PMS operation is normally maintained released. Accordingly, when it is required to perform only an FF or REW operation, it is unnecessary to manually release the PMS operation, unlike the case of the conventional tape recorder. That is, the FF or REW operation can be performed by operating the FF or REW operation button only. Thus, a tape recorder of the invention, unlike the conventional device, can be operated with ease and is free from erroneous operation. That is, the tape recorder can be operated quickly and accurately at all times.

What is claimed is:

1. A tape recorder comprising: a fast-forward button; a rewind button; an inter-music detector activating button arranged immediately adjacent to both said fast-forward button and said rewind button, wherein both said inter-music detector activating button and a selected one of said fast-forward button and said rewind button are actuatable simultaneously with one finger; and means for locking an inter-music detector activating function of said inter-music detector activating button upon actuation of one of said fast-forward button and said rewind button and for releasing said inter-music detector function upon release of said one of said fast-forward button and said rewind button.

2. The tape recorder of claim 1 wherein said fast-forward button and said rewind button have cut-out portions formed on adjacent sides thereof and said inter-music detector actuating button is arranged in said cut-out portions.

3. The tape recorder of claim 1 wherein said means for locking and releasing said inter-music detector function comprises an inter-music activating lever having an engaging plate at one end thereof positioned to be pressed upon upon pressing said inter-music detector activating button; a fast-forward operation plate having a bent portion disposed to be elastically abutted against a shoulder of a fast-forward activating lever, an end face abutted against said fast-forward button, and an engaging pawl adapted to engage said engaging plate of said inter-music detector activating lever upon rotation of said fast-forward operation plate; a rewind operation plate having a bent portion elastically abutted against a shoulder of a rewind activating lever, an end face abutted against said rewind button, and an engaging pawl adapted to engage said engaging plate of said inter-music detector activating lever upon rotation of said rewind operation plate; and a tension spring connected between said fast-forward operation plate and said rewind operation plate.

4. The tape recorder of claim 3 wherein said fast-forward lever and said rewind lever are rotatably mounted upon a common shaft.

5. The tape recorder of claim 1 wherein said means for locking and releasing said inter-music detector function comprises electronic circuit means adapted to be set in response to operation of said inter-music detector activating button and released upon detection of an inter-music interval on a magnetic tape.

6. The tape recorder of claim 5 wherein said electronic circuit means comprises a first normally-open switch disposed to be actuated by said fast-forward button; a second normally-open switch disposed to be actuated by said rewind button; a third normally-open switch disposed to be actuated by said inter-music detector activating button; first through third set-reset flip-flops, said first through third flip-flops having set inputs coupled, respectively, to outputs of said fast-forward switch, said rewind switch, and said inter-music detector actuating switch, reset inputs coupled to receive a signal indicative of the presence of an inter-music interval on said tape, and outputs coupled to control fast-forward, rewind and inter-music-detecting operations of said tape recorder.

7. The tape recorder of claim 6 wherein said fast flip-flop has a reset input additionally coupled to said outputs of said rewind switch and said second flip-flop has a reset input coupled to said output of said fast-forward switch.

* * * * *